United States Patent
Lim et al.

(10) Patent No.: US 7,535,930 B2
(45) Date of Patent: May 19, 2009

(54) GEM FRAME STRUCTURE SHOWING PAYLOAD TYPE OF FRAME AND METHOD FOR PROCESSING DATA THEREOF

(75) Inventors: Se-Youn Lim, Seoul (KR); Jong-Hwa Lee, Suwon-si (KR); Yoon-Sun Lee, Seoul (KR); Seo-Won Kwon, Suwon-si (KR); Jae-Yeon Song, Seongnam-si (KR); Jin-Hee Kim, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 834 days.

(21) Appl. No.: 10/800,518

(22) Filed: Mar. 15, 2004

(65) Prior Publication Data

US 2004/0202470 A1    Oct. 14, 2004

(30) Foreign Application Priority Data

| Apr. 10, 2003 | (KR) | ............... 10-2003-0022698 |
| Aug. 2, 2003 | (KR) | ............... 10-2003-0053649 |
| Oct. 2, 2003 | (KR) | ............... 10-2003-0068948 |

(51) Int. Cl.
*H04J 3/24* (2006.01)

(52) U.S. Cl. .................. 370/474; 370/395.51
(58) Field of Classification Search ............ 370/229, 370/230, 241, 254, 395, 474, 395.51
See application file for complete search history.

(56) References Cited

U.S. PATENT DOCUMENTS

| 6,498,667 | B1 * | 12/2002 | Masucci et al. ............ 398/98 |
| 7,031,343 | B1 * | 4/2006 | Kuo et al. ................. 370/473 |
| 2003/0137975 | A1 * | 7/2003 | Song et al. ............... 370/353 |
| 2003/0219015 | A1 * | 11/2003 | Six et al. ................. 370/389 |
| 2004/0052274 | A1 * | 3/2004 | Wang et al. .............. 370/468 |
| 2004/0136534 | A1 * | 7/2004 | Stiscia et al. ............. 380/256 |

(Continued)

FOREIGN PATENT DOCUMENTS

WO    WO01/69834 A1    9/2001

OTHER PUBLICATIONS

Charles Spurgeon; "Ethernet: The Definitive Guide;" Dec. 20, 2000; 3 pgs.

(Continued)

*Primary Examiner*—Ricky Ngo
*Assistant Examiner*—Ben H Liu
(74) *Attorney, Agent, or Firm*—Cha & Reiter, LLC

(57) ABSTRACT

An optical network terminal (ONT) management control protocol of gigabit-capable passive optical network. A gigabit-capable passive optical network encapsulation method (GEM) frame structure that supports delivery of ONT management control information for an optical network unit (ONU) using a GEM and a method for processing data using the GEM frame structure. The GEM frame structure includes in the GEM header a payload type of the GEM header frame, and is used for a gigabit-capable passive optical network (GPON), wherein payload type information, which represents a data type of a payload portion of the GEM frame, is displayed in a header of the GEM frame, in order to provide a GEM control frame which delivers management control information transferred from an OLT (Optical Line Termination).

7 Claims, 6 Drawing Sheets

U.S. PATENT DOCUMENTS

2004/0190548 A1* 9/2004 Harel et al. .................. 370/466
2004/0246989 A1* 12/2004 Brolin ........................ 370/466

OTHER PUBLICATIONS

"Efficient Transport of Packets with QoS in an FSAN-Aligned GPON;" John D. Angelopoulos et al.; IEEE Communications Magazine; vol. 42, No. 2; Feb. 2004; XP-001047862; 7 pages.

"The Generic Framing Procedure (GFP): An Overview;" Enrique Hernandez-Valencia et al.; IEEE Communications Magazine; vol. 40, No. 5; May 2002; XP-001129440; 9 pages.

"GigaPON Access Network Top Level Specification of the PTSP, TC and MAC Components;" Ing-Jyh Tsang et al.; Mar. 12, 2003; XP-002288126; 38 pages.

* cited by examiner

| ATM HEADER VPI (301) | TRANSACTION CORRELATION IDENTIFIER (302) | MESSAGE TYPE (303) | DEVICE IDENTIFIER (304) | MESSAGE IDENTIFIER (305) | MESSAGE CONTENTS (306) | AAL5 TRAILER (307) |

FIG.3
(PRIOR ART)

GEM FRAME STRUCTURE SHOWING PAYLOAD TYPE OF FRAME AND METHOD FOR PROCESSING DATA THEREOF

CLAIM OF PRIORITY

This application claims priority to an application entitled "GEM frame structure showing payload type of frame and method for processing data thereof," filed in the Korean Intellectual Property Office on Apr. 10, 2003, Aug. 2, 2003, and Oct. 2, 2003 and assigned Serial Nos. 2003-22698, 2003-53649, 2003-68948, respectively, the contents of which are hereby incorporated by reference.

BACKGROUND OF THE INVENTION

1. Field of the Invention

The present invention relates to an ONT management control protocol in a gigabit-capable passive optical network (hereinafter, simply referred to as 'GPON').

2. Description of the Related Art

In order to construct access networks from a telephone office to a building and a home, there have been recent suggestions regarding various types of network structures, and methods for improving the existing various network structures. For example, the various network structures and the methods for improving the various network structures include xDSL (x-Digital Subscriber Line), HFC (Hybrid Fiber Coax), FTTB (Fiber To The Building), FTTC (Fiber To The Curb), FTTH (Fiber To The Home) and so forth. Among them, the FTTx (x=B, C, H) can be classified into an active FTTx embodied as a structure of an active optical network (hereinafter, simply referred to as 'AON') and a passive FTTx embodied as a structure of a passive optical network (hereinafter, referred to as 'PON').

The relationship of PONs with that of passive FTTxs has a point-to-multipoint topology using passive elements. Due to this relationship, the PON has been suggested as a scheme for constructing future access networks having improved economical efficiency as compared with other types of access networks. For example, in the PON, one optical line termination (hereinafter, simply referred to as 'OLT') is connected to a plurality of optical network units (hereinafter, simply referred to as 'ONUs') by using a 1×N passive optical distribution network (hereinafter, simply referred to as 'ODN'), thereby constructing a distribution topology having a tree structure.

Additional, with regard to PONs, an asynchronous transfer mode-passive optical network (hereinafter, simply referred to as 'ATM-PON') has been initially developed and standardized. Standardized contents about the ATM-PON have been described in ITU-T G.982, ITU-T G983.1, and ITU-T G.983.3 issued by ITU-T (International Telecommunication Union-Telecommunication section). Moreover, a standardization work for a gigabit-capable passive optical network (hereinafter, simply referred to as 'GPON') is still being carried out by the ITU-T.

FIG. 1 shows a structure of a conventional PON. The conventional PON includes one OLT 10 and a plurality of ONUs. As shown in FIG. 1, one OLT 10 is connected to three ONUs 12a, 12b, and 12c by means of an ODN 16.

Referring to FIG. 1, the OLT 10 is positioned at a root of a tree structure and has a main function of providing information to subscribers of access networks. The ODN 16 is connected to the OLT 10 and has a tree topology. Also, the ODN 16 distributes downstream data frames transmitted from the OLT 10 to the ONUs 12a, 12b and 12c and transfers upstream data frames transmitted from the ONUs 12a, 12b and 12c to the OLT 10 by multiplexing the upstream data frames. Meanwhile, the ONUs 12a, 12b, and 12c receive the downstream data frames to provide the downstream data frames to terminal users 14a, 14b, and 14c. In addition, the ONUs 12a, 12b, and 12c transfer data outputted from the terminal end users 14a, 14b, and 14c as the upstream data frames to the OLT 10 through the ODN 16. At this time, the terminal users 14a, 14b, and 14c connected to the ONUs 12a, 12b, and 12c, respectively, signify various kinds of access network terminal apparatuses which can be used in the PON having an NT (Network Terminal).

In general, the data frame used for transmission in an ATM-PON includes ATM cells having a size of 53 bytes packaged in a predetermined size is upwardly or downwardly transmitted in the ATM-PON. In the PON having the tree structure shown in FIG. 1, the OLT 10 appropriately inserts downstream cells to be distributed to each of the ONUs 12a, 12b, and 12c into a downstream frame. Also, when performing the upstream transmission, the OLT 10 accesses data transferred from the ONUs 12a, 12b, and 12c using a TDM (Time Division Multiplexing) method. At this time, since the OLT 10 is connected to the ONUs 12a, 12b, and 12c by means of the ODN 16, which is a passive element, the OLT 10 prevents data from colliding with each other in the ODN 16 by using a virtual distance correction algorithm, which is called "ranging". In addition, when performing the downstream transmission to the ONUs 12a, 12b, and 12c from the OLT 10, the OLT 10 exchanges with the ONUs 12a, 12b and 12c an encryption key, which is used for encrypting data in order to maintain security, and an OAM (Operations, Administration and Maintenance) message, which is used for maintenance and management. Accordingly, a dedicated ATM cell or a data field within a general ATM cell for exchanging messages by a predetermined interval is provided in the upstream/downstream frame.

A broadband passive optical network (hereinafter, referred to as 'BPON') that is based on the G.983 series, which has been already standardized as described above, operates on the basis of ATM. However, the GPON supports a transfer mode based on cells which deals with ATM services (called 'ATM'). Also, the GPON supports GEM (GPON Encapsulation Method) which deals with packets having a variable length like TDM (Time Division Multiplex) and Ethernet services (called 'GEM'). At this time, the ATM maps transmission data into GTC frames with a cell unit to transfer the transmission data. Also, the GEM maps transmission data into GTC frames with a frame unit to transfer the transmission data.

FIG. 2 shows a protocol stack structure in a conventional GPON. Referring to FIG. 2, a protocol stack in the GPON includes a protocol layer 100 for interfacing with an upper layer, a GTC layer 200, and a GPM (GPON Physical Media dependent) layer 300. The protocol layer 100 includes an ATM (Asynchronous Transfer Mode) client 110, an OMCI (ONT Management Control Interface) 120, a GEM client 130, and a PLOAM (Physical Layer Operation Administration Maintenance) module 140.

The protocol stack of the GPON having the above structure multiplexes frames delivered from the upper layer into the GTC frames in the GTC layer 200 to transfer the multiplexed frames. In addition, the ATM client 110 supports a transmission method of the ATM. The GEM client 130 supports a transmission method of the GEM.

The ATM client 110 maps transmission data into the GTC frames with a fixed-length cell unit using the ATM. At this time, even though a space having a length smaller than a cell length (generally, 53 bytes) remains within the GTC frames, the transmission data are transferred by mapping the transmission data into a next frame. Accordingly, in a case of the ATM, cells are not divided.

However, when the GEM client 130 maps GEM frames into the GTC frames, since the GEM frames are packets having a variable length, the GEM client 130 may divide the GEM frames to transfer the divided GEM frames in order to efficiently use a bandwidth.

For example, the GEM client 130 receives space information (e.g., length) of currently-waiting GTC frames from the GTC layer 200 when the GEM client 130 receives user data from the upper layer. The GEM client 130 may divide the user data into a plurality of GEM frames, or can make one GEM frame without dividing the user data on the basis of space information. Thereafter, the GEM client 130 transfers the GEM frames to the GTC layer 200. The GTC layer 200 maps the GEM frames into the currently-waiting GTC frames to transfer the GEM frames.

Meanwhile, a receiving side transfers the GEM frames divided as mentioned above to the upper layer after assembling the divided GEM frames in the GEM layer 20.

Conventionally, an ONT management control protocol is provided for the BPON. The BPON operates on the basis of the ATM as suggested in G.983.1 series. Also, G.983.2 series suggests that an ONT management control interface of the BPON. The ONT management control interface of the BPON also operates on the basis of the ATM. In addition, the G.983.2 series suggests that a structure of a frame based on ATM cells which deliver management control information.

FIG. 3 illustrates the structure of the frame for delivering BPON ONT management control information that is suggested in the G.983.2. Hereinafter, fields included in the frame will be described in detail.

First, an ATM header 301 represents the VPI (Virtual Path Identifier)/VCI (Virtual Channel Identifier) values which are channel addresses used for management control.

A transaction correlation identifier 302 represents a relation between a request message and a response message.

A message type 303 represents a sort of a message.

A device identifier 304 represents a system based on ITU-T G.983.1 (OxOA).

A message identifier 305 represents both "managed entity" and "managed entity instance".

Message contents 306 represent contents of messages defined by the message type 303.

FIG. 4 illustrates a conventional structure of a GEM frame supporting the TDM and the Ethernet services. The structure of the conventional GEM frame is defined in order to support a TDM frame or an Ethernet frame.

Referring to FIG. 4, the conventional GEM frame includes PLI(L) (16 bits) 410, Port ID (12 bits) 420, Frag (2 bits) 430, FFS (2 bits) 440, HEC (16 bits) 450, and Fragment Payload (L bytes) 460.

The PLI (Payload Length Identifier) 410, the Port ID 420, the Frag 430, the FFS 440, and the HEC 450 are included in a GEM header.

The PLI 410 represents a payload length. The Port ID 420 represents an ID for discriminating traffics in order to provide traffic multiplexing. The Frag 430 represents a division state of a payload. HEC 450 is a field for a header error detection and a header error correction. Meanwhile, the FFS 440 is a reserved field.

The Frag 430 included in the conventional GEM frame header represents whether or not a currently-transferred GEM payload is a divided frame by using 2 bits thereof. For instance, the GEM frame, which is not divided, is represented by setting the Frag 430 as '11'. If the GEM frame has been divided, a start frame of the GEM frame, which has been divided. is represented by setting the Frag 430 as '10', a middle frame of the GEM frame, which has been divided, is represented by setting the Frag 430 as '00', and the last frame of the divided GEM frame, which has been divided, is represented by setting the Frag 430 as '01'. Accordingly, the Frag 430 represents whether or not the GEM frame has been divided. Also, if the GEM frame has been divided, the Frag 430 represents a position of a divided GEM frame in the GEM frame.

Meanwhile, an OLT makes communication with a plurality of the ONTs (ONUs) in the GPON that is being standardized in ITU-T. At this point in time, the OLT can support both ATM and GEM, or any one of both ATM and GEM to transfer data. However, ITU-T suggests in such a manner that the ONTs (ONUs) support only one mode of both ATM and GEM. In addition, the OLT requires the ONT management control interface in order to manage the ONTs (ONUs) connected thereto for communication. Therefore, the ONT management control interface must support the different transmission modes because the OLT may make communication with the ONTs (ONUs) by using different transmission modes from each other.

However, the protocol for the ONT management control interface, which is suggested in the G.983.2, is performed on the basis of the ATM. Accordingly, ONT management control packets are transferred by using the ATM cells of 53 bytes (refer to FIG. 3). At this time, the ATM header represents the VPI/VCI values which are channel addresses for the ONT management control interface. Also, information such as the Transaction Correlation Identifier 302, the Message Type 303, the Device Identifier 304, the Message Identifier 305, the Message Contents 306, and an ATM trailer 307 are delivered through an ATM cell payload. Accordingly, the ONTs (ONUs), which operate by using the ATM, can use the ONT management control interface suggested by the G.983.2.

However, there is a problem in that an ONT management control interface of the GEM and an ONT management control interface of the ATM are defined separately in the GPON. Accordingly, ONTs (ONUs) which operates by using the GEM cannot use the ONT management control interface of the ATM.

Accordingly, an ONT management control packet structure based on the GEM frame which can support ONT management control information must be defined in the GEM. That is, there is a need for a method for delivering control information must be considered in GEM protocol.

SUMMARY OF THE INVENTION

Accordingly, the present invention has been made in part to solve the above-mentioned problems occurring in the prior art. A first aspect of the present invention is to provide a GEM frame structure which can support delivery of ONT management control information for an ONU using a GEM and a method for processing data using the GEM frame structure.

In order to accomplish the above-mentioned aspect of the invention, according there is provided a GEM frame structure showing a payload type of a frame and used for a gigabit-capable passive optical network (GPON), wherein a payload type of information, which represents a data type of a payload of the GEM frame, is displayed in a header of the GEM frame, in order to provide a GEM control frame that delivers management control information transferred from an OLT (Optical Line Termination).

According to another aspect of the present invention, there is provided a method for processing data in a gigabit-capable passive optical network (GPON), the method comprising the steps of: checking whether or not a received frame is an ATM frame when an OLT (Optical Line Termination) receives the frame to be transferred; transmitting the received frame in an ATM cell transmission method if the received frame is the ATM frame; deciding that the received frame is GEM frame if the received frame is not the ATM frame, and checking whether or not the received frame is a data frame; transferring the received frame with displaying a payload type thereof by performing a data encapsulation with respect to the received frame if the received frame is a data frame; and creating a control frame by using the received frame and transferring the control frame with representing the payload type thereof, if the received frame is not the data frame.

According to still another aspect of the present invention, there is provided a method for processing data in a gigabit-capable passive optical network (GPON), in which a GEM frame is transferred with representing a payload type of the GEM frame in a header of the GEM frame for performing an operation according to a represented payload type, wherein an ONT (Optical Network Terminal) supports a GEM method through the steps of: receiving a frame transferred from an OLT (Optical Line Termination) so as to check whether or not the received frame is an ATM (Asynchronous Transfer Mode) frame; checking information about a payload type included in a header of the received frame as a checked result of step i), if the received frame is not the ATM frame; and processing the received frame depending on the payload type of the received frame.

BRIEF DESCRIPTION OF THE DRAWINGS

The above and other objects, features and advantages of the present invention will be more apparent from the following detailed description taken in conjunction with the accompanying drawings, in which:

FIG. 3 illustrates a structure of a frame for delivering BPON ONT management control information which is suggested by G.983.2 series.

DETAILED DESCRIPTION OF THE PREFERRED EMBODIMENT

Figure 1:
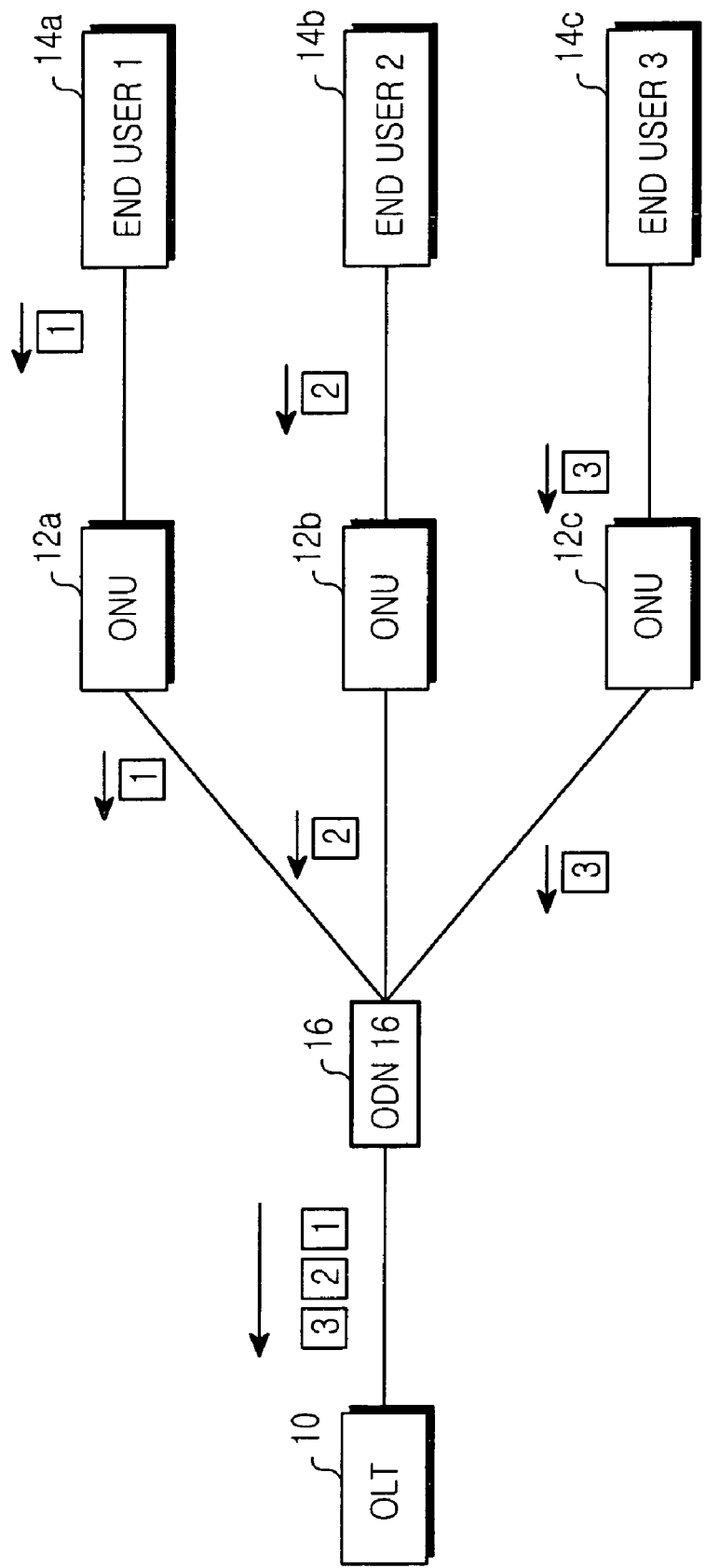
FIG. 1 illustrates a structure of a conventional PON.
Figure 2:
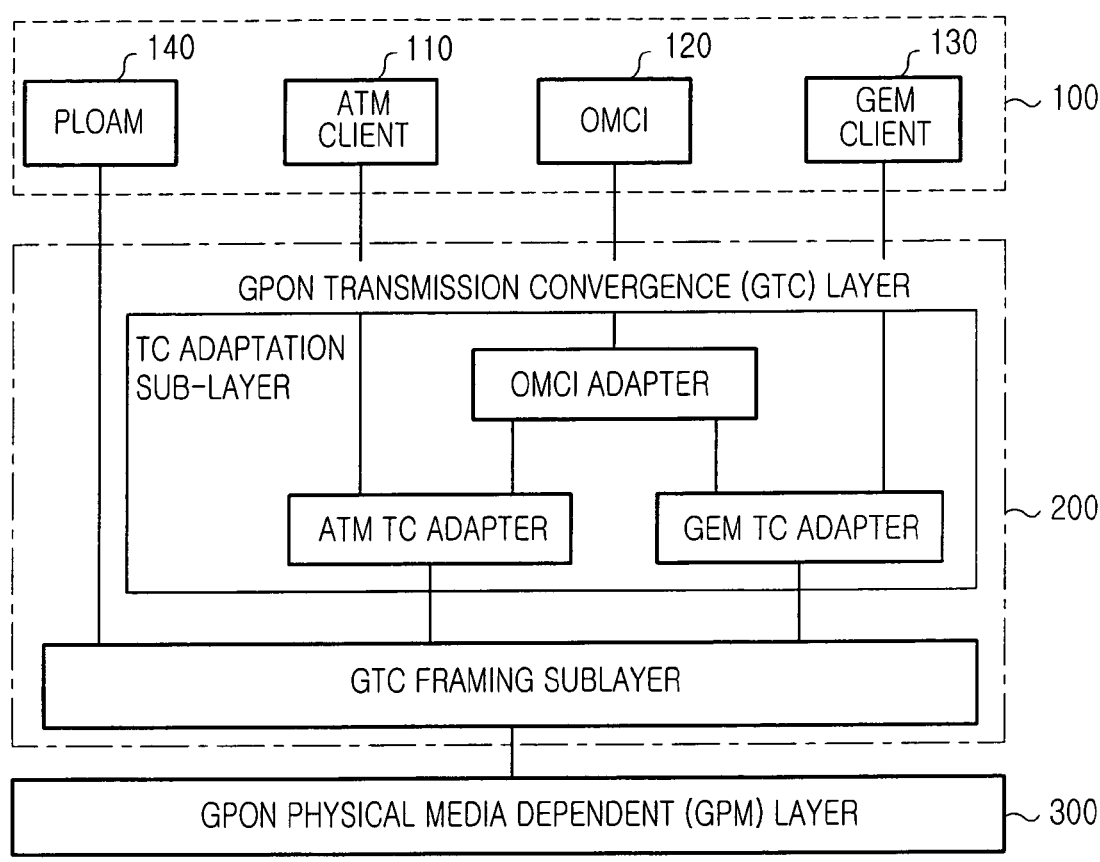
FIG. 2 illustrates a protocol stack structure in a conventional GPON.
Figure 4:
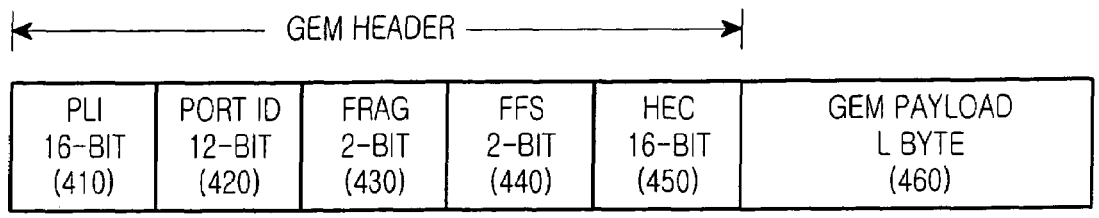
FIG. 4 is a view showing a structure of a GEM frame for supporting conventional TDM and Ethernet services.

Hereinafter, preferred descriptions of the present invention will be described in detail with reference to the accompanying drawings. Note that the same or similar components in drawings are designated by the same reference numerals as far as possible, although they are shown in different drawings. In the following description of the present invention, a detailed description of known functions and configurations incorporated herein will be omitted when it may make the subject matter of the present invention rather unclear.

Currently, GEM frames are defined only in order to support TDM data and Ethernet data. Therefore, according to the present invention, the GEM frames are primarily divided into a data frame and a control frame, and the data frame is subsequently divided into a TDM data frame and an Ethernet data frame. Lastly, the control frame is defined.

According to the present invention, it is necessary to define a new field for representing a payload type of the GEM frames as described above. Fort example, a GEM frame which is newly defined according to the present invention in order to match with such a necessity is shown in FIG. 5.

Figure 5:
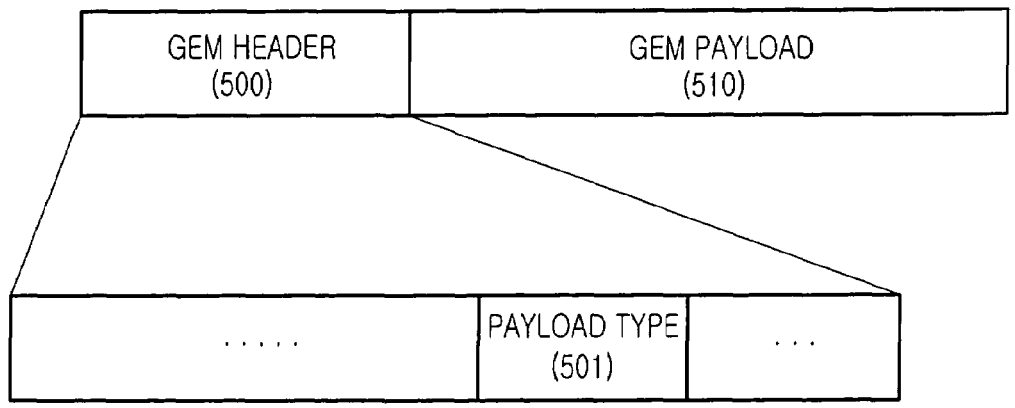
FIG. 5 is a view showing a structure of a GEM frame according to one aspect of the present invention.

FIG. 5 illustrates a structure of the GEM frame according to an aspect of the present invention. Referring to FIG. 5, the GEM frame is divided into a GEM header 500 and a GEM Payload 510. In addition according to the present invention, the GEM header 500 includes a Payload type 501.

The GEM header 500 represents a length of the GEM Payload 510. In order to provide traffic multiplexing, the GEM header 500 includes values for discriminating traffics. Accordingly, the GEM header 500 is a portion having information about the GEM Payload 510.

According to a particular aspect of the present invention, the Payload type field 501 is included in the GEM header 500, so that the Payload type field 501 represents whether the GEM frame is the control frame, the TDM data frame, or the Ethernet data frame. That is, the Payload type field 501 defines the type of GEM frame by representing a predetermined value corresponding to the GEM Payload 510 of the GEM frame, which includes the GEM header 500 and the GEM Payload 510, in the GEM header 500. To reiterate, the Payload type field 501 represents a frame type of the GEM frame.

For example, the Payload type field 501 is represented as two bits. A value "00" of the Payload type field 501 represents the GEM frame that corresponds to the control frame. A value '01' of the Payload type field 501 represents the GEM frame that corresponds to the TDM data frame. Also, a value '10' of the Payload type field 501 represents the GEM frame that corresponds to the Ethernet data frame. In this particular example, two bits of the Payload type field 501 are the number of bits defined according to the present invention. However, it should be understood by a person of ordinary skill in the art that a bit number of the Payload type field 501 is not limited to two bits. Accordingly, the Payload type field 501 can have two bits in order to represent the frame type. Also, a size of the Payload type field 501 can be more specifically defined in order to represent other information together with the frame type.

The Payload type field 501 can be used by means of an unused field of the GEM header 500 according to the present invention. Also, the Payload type field 501 can be included in other field of the GEM header 500 so as to be used.

Figure 6:
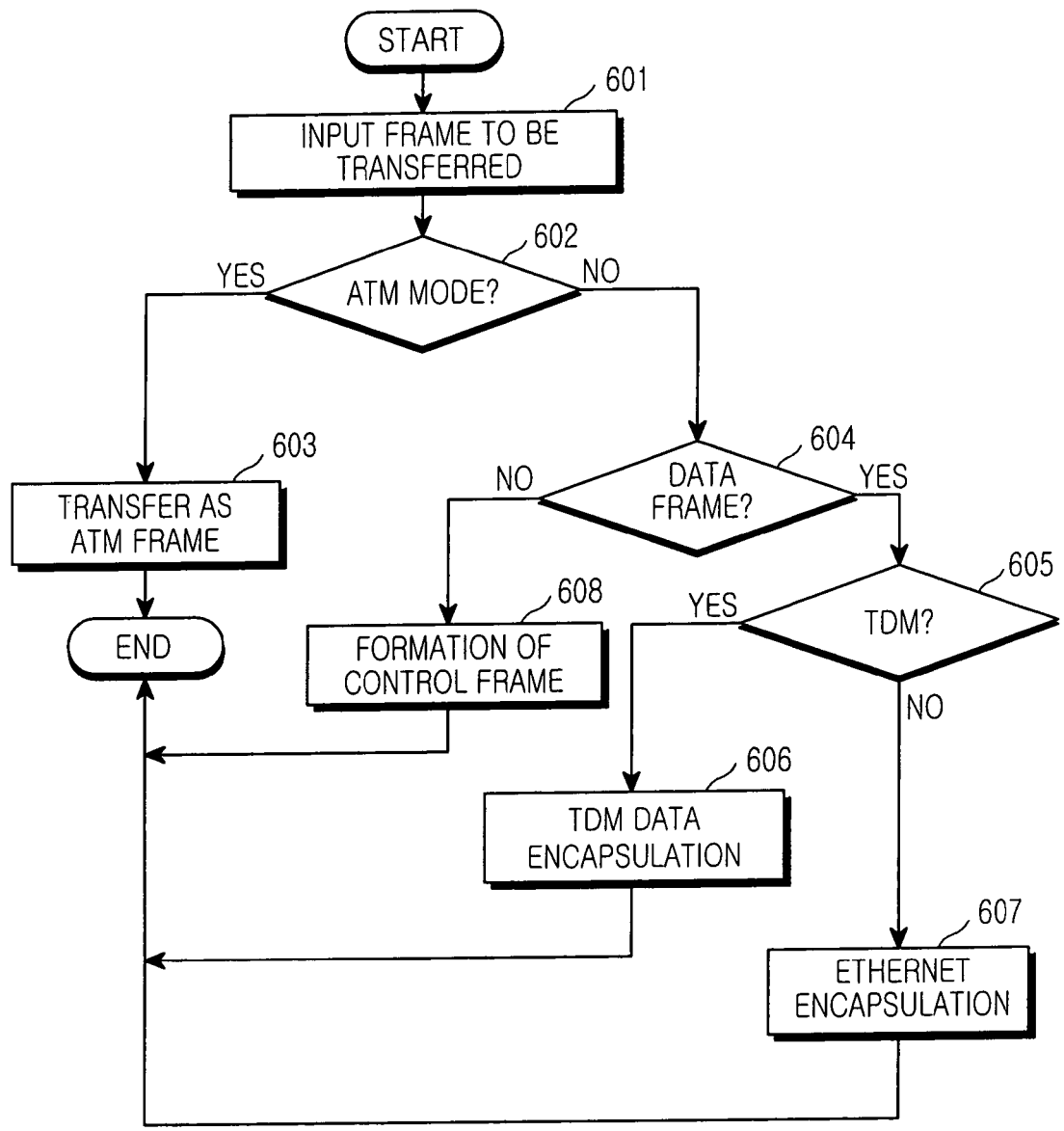
FIG. 6 is a flow chart showing a data transmission procedure through a method for processing data using a GEM frame according to another aspect of the present invention.

FIG. 6 is a flow chart showing data transmission procedures through a method for processing data using the GEM frame according to a particular aspect of the present invention. First, if a frame to be transferred is input (step 601), the frame is checked whether or not the input frame is an ATM frame (step 602). As a result of the checking, if the input frame is the ATM frame, the input frame is transferred as the ATM frame (step 603).

Meanwhile, as a result of inspection in step 602, if the input frame is not the ATM frame, the input frame is considered as the GEM frame. Thereafter, it is checked whether or not the input frame is the data frame (step 604). If the input frame is the data frame, a transmission method of the corresponding data is checked whether the corresponding data are transmitted through the TDM or the Ethernet so as to transmit the corresponding data through a TDM data encapsulation or an Ethernet data encapsulation depending on the transmission method thereof (steps 605 to 607).

In addition, if the input frame is not the data frame, the control frame is created and transferred (step 608).

Figure 7:
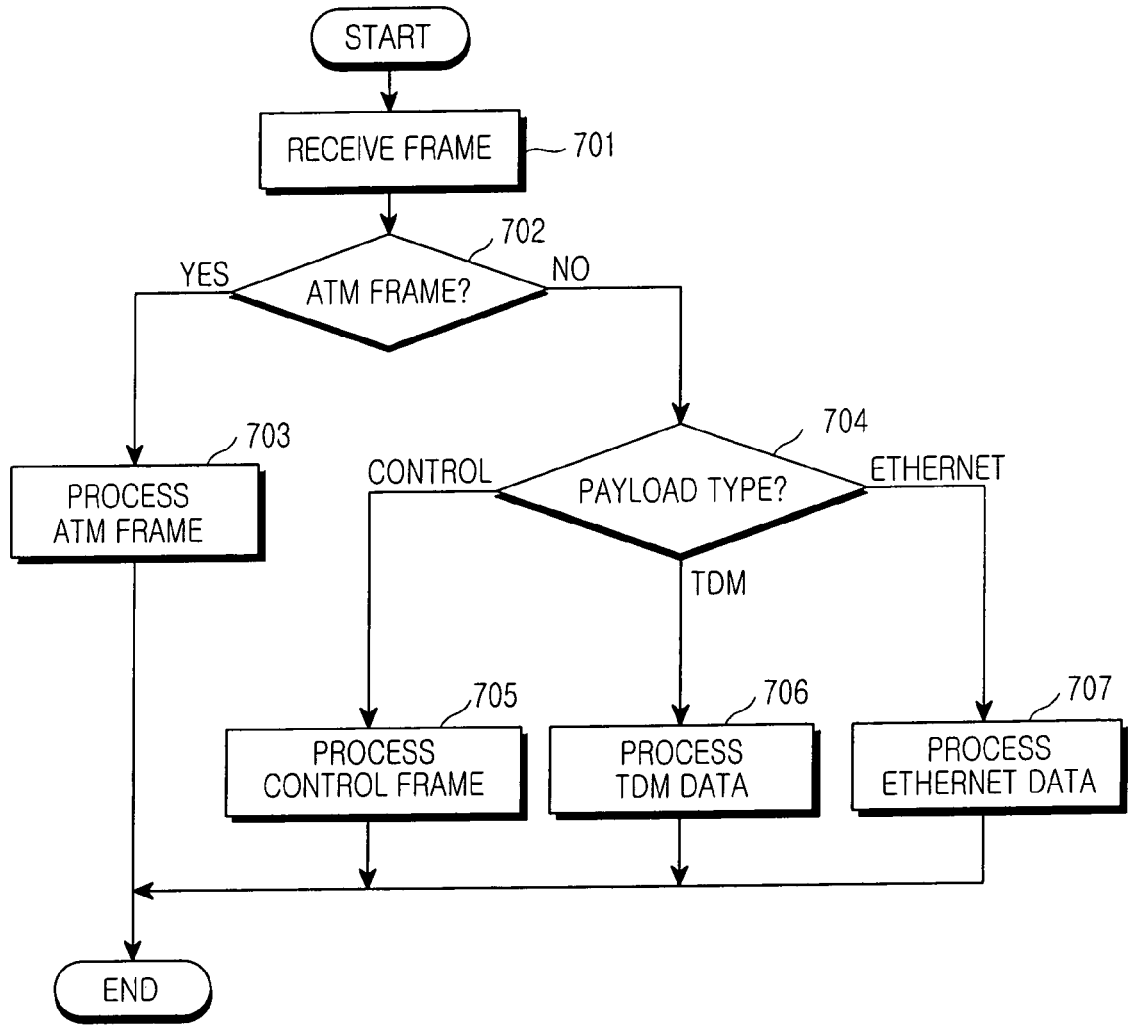
FIG. 7 is a flow chart showing a data reception procedure through a method for processing data using a GEM frame according an aspect of the present invention.

FIG. 7 is a flow chart showing a data receiving procedure in a method for processing data using the GEM frame according to an aspect of the present invention.

First, if an ONU receives a data frame (step 701), it is checked whether or not the data frame is the ATM frame (step 702).

If the data frame is the ATM frame, the data frame is processed by a method for processing the ATM frame (step 703). That is, according to the present invention, an ONU supporting the GEM processes the data frame as an error.

Meanwhile, if the data frame is not the ATM frame, a payload type of the data frame is inspected (step 704). According to a result of the inspection operations corresponding to the control frame, the TDM data frame, and the Ethernet data frame are performed (steps 705 to 707).

As described above, according to this aspect of the present invention, even though a field representing a payload type is included in the GEM header, the field representing the payload type can be included in other position of the GEM frame. In addition, according to the present invention, only a mechanism of delivering the ONT management control information is defined, but detailed fields of the control frame are not defined.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for generating a gigabit-capable passive optical network (GPON) encapsulation method (GEM) frame structure in a gigabit-capable passive optical network, the method comprising the steps of:
   i) receiving payload information of the GEM frame to provide a GEM control frame delivering management control information,
   ii) generating information representing data type information included in a payload according to payload information of the GEM frame,
   iii) including information generated in step ii) into a header of the GEM frame and generating a new GEM frame structure for determining a payload information of the GEM frame, through the header,
   wherein information representing data type information included in the payload represents a data type of a payload of the GEM frame, and the GEM frame is one of the control frame, a TDM (Time Division Multiplex) data frame, or an Ethernet data frame.

2. The method for generating a GEM frame structure as claimed in claim 1, wherein the payload type information is represented by means of a reserved field, with no predetermined value, in the header of the GEM frame.

3. The method as claimed in claim 1, wherein the payload type information is included in predetermined fields having predetermined values in the header of the GEM frame, so that payload type information represents the data type of the payload of the GEM frame.

4. A method for processing data in a gigabit-capable passive optical network (GPON), the method comprising the steps of:
   i) checking whether a received frame is an ATM frame when an OLT (Optical Line Termination) receives the frame to be transferred;
   ii) transmitting the received frame in an ATM cell transmission method if the received frame is identified as the ATM frame in step i);
   iii) deciding whether the received frame is a GEM frame if the received frame is not the ATM frame, and checking whether the received frame is a data frame;
   iv) transferring the received frame while displaying a payload type including a payload type information, which represents a data type of a payload of the frame in a predetermined field of a header of the frame thereof by performing a data encapsulation with respect to the received frame if the received frame is a data frame; and
   v) creating a control frame by using the received frame and transferring the control frame with representing the payload type thereof, if the received frame is not the data frame;
   wherein, if the received frame is the GEM frame, the GEM frame comprises a newly generated GEM frame structure including a GEM frame header having a field representing that a payload of the GEM frame is a control frame, a TDM (Time Division Multiplex) data frame, or an Ethernet data frame, thereby representing the payload type.

5. The method as claimed in claim 4, wherein step iv) includes the substeps of:
   vi) checking a transmission method of the received frame if the received frame is the data frame;
   vii) performing a TDM data encapsulation with respect to the received frame and transferring the received frame with representing the payload type thereof, if the transmission method confirmed in step vi) is a TDM method; and
   viii) performing an Ethernet data encapsulation with respect to the received frame and transferring the received frame with representing the payload type thereof, if the transmission method checked in step vi) is an Ethernet method.

6. A method for processing data in a gigabit-capable passive optical network (GPON), in which a GPON encapsulation method (GEM) frame is received comprising a newly generated GEM frame structure having a header representing a payload type of the GEM frame including a payload type information, which represents a data type of a payload of the frame in a predetermined field of a header of the GEM frame for performing an operation according to a represented payload type, wherein an ONT (Optical Network Terminal) supports a GEM method through the steps of:
   i) receiving a frame transferred from an OLT (Optical Line Termination) so as to check whether the received frame is an ATM (Asynchronous Transfer Mode) frame;
   ii) checking information about a payload type included in a header of the received frame by regarding the received frame as a GEM frame as a checked result of step i), if the received frame is not the ATM frame; and
   iii) processing the received frame depending on the payload type of the received frame;
   wherein the GEM frame includes a GEM frame header having a field representing that a payload of the GEM frame is one of a control frame, a TDM (Time Division Multiplex) data frame, or an Ethernet data frame, thereby representing the payload type of the GEM frame in the GEM frame header.

7. The method as claimed in claim 6, further comprising a step of treating the received frame as an error, if the received frame is the ATM frame as a checked result of step i).

* * * * *